US 9,143,716 B2

United States Patent
Laabs et al.

(10) Patent No.: US 9,143,716 B2
(45) Date of Patent: Sep. 22, 2015

(54) APPARATUS AND METHOD FOR SWITCHING REAL-TIME MEDIA STREAMS

(75) Inventors: Matthias Laabs, Müchen (DE); Markus Berg, Ismaning (DE); Andreas Metz, Müchen (DE); Aylin Vogl, Müchen (DE); Sonja Langhans, Müchen (DE); Herbert Guist, Fürstenfeldbruck (DE); Siegfried Hauzeneder, Garching (DE)

(73) Assignee: Institut Fur Rundfunktechnik GMBH, Munich (DE)

( * ) Notice: Subject to any disclaimer, the term of this patent is extended or adjusted under 35 U.S.C. 154(b) by 0 days.

(21) Appl. No.: 14/127,941

(22) PCT Filed: Jun. 12, 2012

(86) PCT No.: PCT/EP2012/061054
§ 371 (c)(1),
(2), (4) Date: Mar. 10, 2014

(87) PCT Pub. No.: WO2012/175363
PCT Pub. Date: Dec. 27, 2012

(65) Prior Publication Data
US 2014/0184909 A1 Jul. 3, 2014

(30) Foreign Application Priority Data
Jun. 22, 2011 (DE) .......................... 10 2011 078 021

(51) Int. Cl.
*H04N 5/268* (2006.01)
*H04N 5/445* (2011.01)
(Continued)

(52) U.S. Cl.
CPC ..... *H04N 5/44582* (2013.01); *H04N 21/23602* (2013.01); *H04N 21/64322* (2013.01); *H04L 12/18* (2013.01)

(58) Field of Classification Search
CPC .............. H04N 5/445; H04N 5/44582; H04N 21/6437; H04N 21/47202; H04N 21/4622; H04N 21/435; H04N 21/482; H04N 21/44204; H04N 17/04; H04N 21/4307; H04N 21/478
USPC .......... 370/419, 352, 468, 463; 348/705, 706, 348/723, 725, 554; 725/135, 147, 152, 153
See application file for complete search history.

(56) References Cited

U.S. PATENT DOCUMENTS

| | | | |
|---|---|---|---|
| 8,547,995 B2* | 10/2013 | Gelke et al. | 370/463 |
| 2003/0117999 A1* | 6/2003 | Abrams et al. | 370/352 |

(Continued)

FOREIGN PATENT DOCUMENTS

EP 1 478 187 A2 11/2004

OTHER PUBLICATIONS

International Preliminary Report on patentability dated Dec. 23, 2013, filed in PCT Application No. PCT/EP2012/061054, filed Jun. 12, 2012.
(Continued)

*Primary Examiner* — Trang U Tran
(74) *Attorney, Agent, or Firm* — Workman Nydegger

(57) ABSTRACT

An apparatus (1) for switching real-time media streams of one or multiple sources ($Q_1$, $Q_2$, $Q_3$) to one or multiple sinks ($S_1$, $S_2$, $S_3$) includes one or multiple source ports ($QA_1$, $QA_2$, $QA_3$) for connecting of the one or multiple sources ($Q_1$, $Q_2$, $Q_3$) as well as one or multiple sink ports ($SA_1$, $SA_2$, $SA_3$) for connecting of the one or multiple sinks ($S_1$, $S_2$, $S_3$). The apparatus (1) is adapted to provide a switching sink ($S_S$) and to switch it to a real-time media stream of a first source ($Q_1$). The switching sink ($S_S$) is adapted to receive the real-time media stream of the first source ($Q_1$) in a packet-switched format and to forward the received real-time media stream in a packet-switched format, wherein the packets are provided with a first multi-point destination address ($IPMZ_S$) allocated to the switching sink ($S_S$) during forwarding in order to allow for a connecting of the one or multiple sinks ($S_2$) with the real-time media stream of the first source ($Q_1$) forwarded by the switching sink ($S_S$). The switching sink ($S_S$) represents the source of the real-time media stream forwarded by the switching sink ($S_S$) from the "point of view" of the sinks ($S_1$, $S_2$, $S_3$) connected to the apparatus, with which the sinks ($S_1$, $S_2$, $S_3$) can connect through the multi-point destination address ($IPMZ_S$).

11 Claims, 4 Drawing Sheets

(51) Int. Cl.
*H04N 21/236* (2011.01)
*H04N 21/643* (2011.01)
*H04L 12/18* (2006.01)

(56) References Cited

U.S. PATENT DOCUMENTS

2009/0097496 A1 4/2009 Nakamura et al.
2009/0106807 A1 4/2009 Suzuki et al.
2009/0285273 A1 11/2009 Mizutani
2011/0122877 A1 5/2011 Gelke et al.

OTHER PUBLICATIONS

International Search Report dated Nov. 31, 2012, issued in PCT Application No. PCT/EP2012/061054, filed Jun. 12, 2012.
International Preliminary Report and Written Opinion dated Dec. 2, 2013, issued in PCT Application No. PCT/EP2012/061054, filed Jun. 12, 2012.

* cited by examiner

APPARATUS AND METHOD FOR SWITCHING REAL-TIME MEDIA STREAMS

DESCRIPTION BACKGROUND OF THE INVENTION

1. Field of the Invention

The invention relates to an apparatus and a method for switching real-time media streams from one or multiple sources to one or multiple sinks. Furthermore, the invention relates to a corresponding computer program.

2. Present State of the Art

In the area of professional TV studios it is common to connect sources of real-time media flows, e.g. TV cameras producing real-time video streams, and corresponding sinks, e.g. suitable studio monitors or digital editing suites, by a serial, digital interface, which is called "Serial Digital Interface (SDI)" in English. The SDI-interface allows for a transmission of uncompressed, unencrypted digital video streams (and optionally of embedded time code streams and/or audio streams) through coaxial cables or optical wave guides and comprises a whole family of standards specified by the SMPTE (English "Society of Motion Pictures and Television Engineers") for different video formats and bit rates respectively. Thus, the standard SMPTE 259M (English "Standard Definition"), also known as SD-SDI, defines for example the digital transmission of PAL video signals (English "Phase Alternating Line") in the 576i format (English "interlaced") with a bit rate of 270 Mbit/s and the standard SMPTE 344M (English "Enhanced Definition"), also known as ED-SDI, allows for a digital transmission of PAL video signals in the 576p format (English "progressive") with a bit rate of 540 Mbit/s. For high-resolution HDTV applications (English "High Definition Television") the standard SMPTE 292M, also known as HD SDI allows for a digital transmission of video signals in the 720p or 1080i format with bit rates of 1.485 Gbit/s and 1.485/1.001 Gbit/s. For even bigger video formats, e.g. in the area of digital cinema or 3D-cinema, suitable standards with correspondingly even higher bit rates are available as well. Examples therefor are the standard SMPTE 372M, also known as Dual-Link HD-SDI, and the standard SMPTE 424M (English "Third Generation"), also termed 3G-SDI.

In order to switch real-time media streams between sources and sinks so-called SDI crossbars are generally used in television studio studio engineering. These devices feature source and sink ports for digital video streams for different SDI formats, e.g. SD-SDI, HD-SDI and 3G-SDI, depending on their equipment components, and allow for a transparent switching of the sinks to the sources, i.e. it is ensured that switching occurs between two chronologically sequent access units, i.e., for instance between two chronologically to subsequent frames with digital video streams. The switching operation occurs for this chronologically predetermined switching points or within predetermined switching ranges respectively, which are defined within the directive SMPTE RP168 (English title "Definition of Vertical Interval Switching Point for Synchronous Video Switching") for video streams in the SDI format, for example.

However, the transmission of real-time media streams by the SDI interface and the switching by means of correspondent SDI crossbars in the television studio has the disadvantage that the studio technology necessary for this is expensive and the maximum cable length of the coaxial cables generally used for the transmission is limited. Therefore, it is desirable for the future not least because of economical aspects to change the serial, digital infra structure used in the television studios to a packet-switched infrastructure, i.e., e.g. IP-based (English "Internet Protocol"), as it is already widely used in recent computer network technology. Such a packet-based solution could be cheaper in the long run than the "special" solution used in studios now, and it could be used for transmission of other formats, e.g. compressed video formats such as JPEG200 or container formats such as MXF (English "Material eXchange Format") in addition to the transmission of digital video streams in the SDI format. Furthermore, the integration of software-based image processing and corresponding storage media would be easier as well within a packet-switched infrastructure.

While there are already existing solutions for the transmission of real-time media streams by IP-based networks with the SMPTE 2022 standard family and the standard SMPTE 2022-6 (English title "High Bit Rate Media Transport over IP Networks" (HBRMT)) in particular allows for the transmission of digital video streams provided in the SDI format by IP-based networks (also called "SDI over IP"), so far there is a lack of suitable solutions for switching such signals transparently, i.e. between two chronologically sequent access units, in a "packet-switched world".

SUMMARY OF THE INVENTION

It is therefore a task of the invention to provide an apparatus and a method for switching real-time media streams from one or multiple sources to one or multiple sinks which allow for a transparent switching of the real-time media streams in a "packet-switched world", e.g. an IP-based network.

According to an aspect of the present invention an apparatus for switching of real-time media streams from one or multiple sources to one or multiple sinks is provided, wherein the apparatus comprises:

one or multiple source ports for connecting the one or multiple sources,
one or multiple sink ports for connecting the one or multiple sinks,
  wherein the apparatus is adapted so as to provide a switching sink and to switch it to a real-time media stream from a first source,
  wherein the switching sink is adapted so as to receive the real-time media stream of the first source in a packet-switched format and to forward the received real-time media stream in a packet-switched format, wherein the packets are provided with a first multi-point destination address allocated to the switching sink during forwarding, in order to allow for a connecting of the one or multiple sinks with the real-time media stream of the first source forwarded by the switching sink.

By adapting the apparatus so as to provide a switching sink and to switch it to a real-time media stream of a first source, e.g. a television camera, and by adapting the switching sink so as to receive the real-time media stream from the first source in a packet-switched format, e.g. an IP-based format, and so as to forward the received real-time media stream in a packet-switched format, wherein the packets are provided with a first multi-point destination address allocated to the switching sink, the switching sink constitutes from the "point of view" of the sinks connected to the apparatus, e.g. suitable studio monitors or digital editing suites in an IP-based network the source of the real-time media stream forwarded by the switching sink, with which the sinks can connect through the multi-point destination address. Since this switching sink/source is provided switchable as an element or port of the apparatus respectively, a transparent switching process can be implemented in the apparatus. In other words: Providing an additional "level" of the switching sink by the apparatus allows for a transparent switching of real-time media streams to be realized. Therefore the non-real-time joining to multi-point destination groups can be regarded as statistic configuration, which corresponds to the cabling when using coaxial cables, but nevertheless does not require any physical access. The actual switching process can then be accomplished without participation of the source or sink in the "switching sink" and can be controlled e.g. by SNMP (English "Simple Network Management Protocol") or by a web interface.

In the description and the claims the term "switching sink" is to be understood abstractly as an element or port of the apparatus respectively, in which the apparatus completely or partly realizes the switching logic for switching the real-time media streams.

It is preferred that the apparatus is further adapted so as to switch the switching sink from a real-time media stream of the first source to a real-time media stream of a second source so that the real-time media stream of the second source ist received by the switching sink.

Furthermore, it is preferred that the apparatus further comprises a buffer and is adapted so as to buffer the data of the real-time media stream of the first source and/or data of the real-time media stream of the second source in the buffer while the switching of the switching sink from the real-time media stream of the first source to the real-time media stream of the second source. Such buffering, i.e. buffering, of real-time media data in the buffer during the switching process will generally be necessary due to the not given synchronicity in packet-switched networks and possibly to the phase shifting between the two real-time media streams.

It is preferred that the apparatus is furthermore adapted so as to terminate during the switching of the switching sink from the real-time media stream of the first source to the real-time media stream of the second source the forwarding of the real-time media stream of the first source by the switching sink at a first switching point pre-determined for this real-time media stream or within a first switching range pre-set for this real-time media stream, and to initiate the forwarding of the real-time media stream of the second source by the switching sink at a second switching point predetermined for this real time media stream or within a second switching range predetermined for this real time media stream. The switching points or switching ranges respectively are preferably located between to chronologically sequent access units, i.e., e.g. for video streams between two chronologically sequent frames, so that a transparent switching is ensured. For digital video streams in the "SDI over IP" format suitable switching points or switching ranges respectively are defined, e.g. in the above mentioned directive SMPTE RP 168.

Furthermore it is preferred that the first and/or the second switching point or the first and/or the second switching range are dependent on a media format of the respective real-time media stream. Furthermore it is preferred that the apparatus is further adapted so as to identify the media format of the respective real-time media stream based on the identification data in the real-time media stream. Such identification data, e.g. the "Video Payload Identifier" (VPID) (see below) comprised in the "SDI over IP" format, allow for a easy identification of the media format (e.g. SDI format 720p@ 1.485 Gbit/s) of a real-time media stream and therefore allow for a correct and transparent switching at a switching point predetermined for this media format or within a predetermined switching range respectively pre-determined for this media format. For a switching range it is preferred to switch between to packets in case the packet boundaries are located within the switching range. If this is not possible, it has to be switched within one packet between the old and the new source.

It is further preferred that the apparatus is further adapted so as to be extendable by input of switching rules which define the switching point or the switching range for a real-time media stream. This allows for real-time media streams with media formats that are so far not supported by apparatus 1, to be processed.

It is preferred that at least one source port is adapted so that one source which is trans-mitting a real-time media stream in the packet-switched format, is connectable to it. Furthermore it is preferred that at least one sink port is adapted so that one sink, which is receiving a real-time media stream in a packet-switched format, is connectable to it. Therefore, the apparatus can be used directly for switching real-time media streams in a corresponding packet-switched environment, e.g. in an IP-based network.

It is preferred that at least one source port comprises a source port converter, which is adapted to convert a real-time media stream of a source connected to the source port from a serial format into the packet-switching format. Furthermore it is preferred that at least one sink port comprises a sink port converter which is adapted to convert a real-time media stream for a sink connected to the sink port from the packet-switched format into a serial format. Therefore, real-time media streams of sources and/or for sinks that only support a serial format, e.g. a SDI format, can be switched with the apparatus.

It is preferred that the apparatus is adapted so as to forward a real-time media of one of the one or multiple source ports in a packet-switched format, wherein the packets feature a second multi-point destination address which allows for a connecting of the one or multiple sinks with the real-time media stream forwarded by the one of the one or multiple source ports.

Furthermore it is preferred that the packet-switched format comprises a format according to the Internet Protocol and the first multi-point destination address is an IP multicast destination address, i.e. a multicast destination address according to the IP multicast protocol. This protocol or protocols respectively are widely spread in the area of recent computer network technology and are particularly suited to be used for implementation of the switching functionality of the apparatus.

According to another aspect of the present invention a method for switching real-time media streams of one or multiple sources to one or multiple sinks is provided, wherein the method comprises:

connecting of the one or multiple sources to one or multiple source ports.

connecting of the one or multiple sinks to one or multiple sink ports, providing of a switching sink and switching it to a real-time media stream of a first source, receiving of the real-time media stream of the first source in a packet-switched format at the switching sink, forwarding of the received real-time media stream in the packet-switched format by the switching sink, wherein the packets are provided with a first multi-point destination address allocated to the switching sink during forwarding, connecting of the one or multiple sinks with the real-time media stream of the first source forwarded by the switching sink.

According to another aspect of the present invention a computer program for switching of real-time media streams of one or multiple sources to one or multiple sinks is provided, wherein the computer program comprises program code means which result in an apparatus according to claim 1 executing the steps of the method according to claim 14 when the computer program is run on a computer which controls the apparatus.

It is pointed out that the apparatus for switching real-time media streams of one or multiple sources to one or multiple sinks according to claim 1, the method for switching real-time media streams of one or multiple sources to one or multiple sinks according to claim 14 as well as the corresponding computer program according to claim 15 can have similar and/or identical preferred embodiments, particularly as defined in the dependent claims.

BRIEF DESCRIPTION OF THE DRAWINGS

In the following embodiments of the invention are described with reference to the subsequent figures, wherein.

DETAILED DESCRIPTION OF THE PREFERRED EMBODIMENTS

Figure 1:
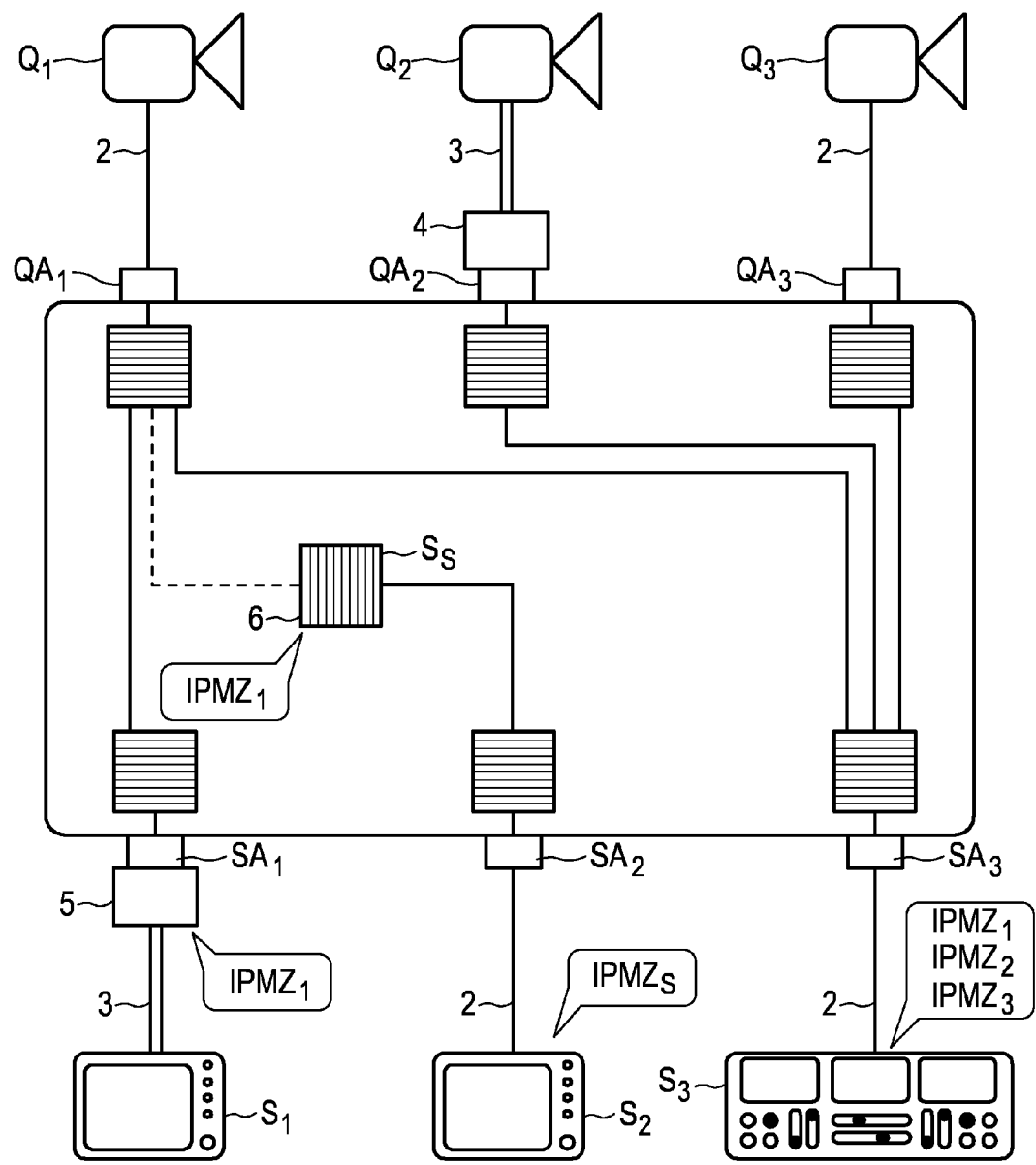
FIG. 1 shows a schematic and exemplary embodiment of an apparatus for switching real-time media streams of one or multiple sources to one or multiple sinks in a first switching status.

In the description and in the figures the same or correspondent components respectively are denoted by the same reference numerals in order of avoiding repetition, in so far as no further differentiation is necessary or reasonable.

FIG. 1 shows a schematic and exemplary embodiment of an apparatus 1 for switching real-time media streams of one or multiple sources $Q_1, Q_2, Q_3$ to one or multiple sinks $S_1, S_2, S_3$ in a first switching status.

As sources $Q_1, Q_2, Q_3$ here three television cameras are provided exemplarily, which are connected to the corresponding source ports $QA_1, QA_2, QA_3$ of the apparatus 1, and as sinks $S_1, S_2, S_3$ two monitors and a digital editing suite are provided, which are connected to the corresponding sink ports $SA_1, SA_2, SA_3$ of the apparatus 1.

Both cameras $Q_1$ and $Q_3$ are connected to the corresponding source ports $QA_1$ and $QA_3$ of the apparatus 1 by Ethernet cables 2 in this embodiment, and create digital video streams directly in a packet-switched format, here in a packet-switched format according to standard SMPTE 2022-6 (henceforth also called "SDI over IP" format for short). The "SDI over IP" format is based on a layer model, in which provided digital video streams in a SDI format are transmitted in IP packets (English "Internet Protocol"), wherein in addition to the protocol layers UDP (English "User Datagram Protocol") and RTP (English "Real-Time Transport Protocol") further information for timing, encryption, etc are provided. It also comprises with the so-called "Video Payload Identifier" (VPID), a standard SMPTE 352M (English title "Television—Video Payload Identification for Digital Television Interfaces") defined identifier, identification data that identify the media format of the transmitted digital video stream.

The camera $Q_2$ is connected to the corresponding source port $QA_2$ of the apparatus 1 by a coaxial cable 3 and creates a digital video stream in a serial format, in this case a SDI format; which is converted into the "SDI over IP" format by a source port converter 4 comprised in the source port $QA_2$.

Apparatus 1 is adapted so as to forward internally the digital video streams created by the sources $Q_1, Q_2, Q_3$, here the three television cameras, from the corresponding source ports $QA_1, QA_2, QA_3$ in the "SDI over IP" format.

The monitor $S_2$ and the digital editing suite $S_3$ are also connected to the corresponding sink ports $SA_2$ and $SA_3$ of the apparatus 1 by Ethernet cables 2 and adapted so as to receive digital video streams directly in the "SDI over IP" format. The monitor $S_1$ is connected to the corresponding sink port $SA_1$ of the apparatus 1 by a coaxial cable 3 and adapted so as to receive a digital video stream in a serial SDI format. The sink port $SA_1$ comprises a sink port converter 5 which is adapted so as to convert a digital video stream forwarded in the apparatus 1 to the sink port $SA_1$ from the "SDI over IP" format into the serial SDI format.

The packets of the "SDI over IP" format of the digital video streams created in the apparatus 1 for forwarding by the sources $Q_1, Q_2, Q_3$, here the three television cameras, feature a multi-point destination address respectively, in this embodiment an IP multicast destination address, which is preferably distinctively configurable for each of the digital video streams. Therefore, the cameras $Q_1$ and $Q_3$ in this embodiment, e.g., can be configured such that they create the packets with an adjustable IP multicast destination address, when they create digital video streams directly in the "SDI over IP" format. In the case of the camera $Q_2$, which creates a digital video stream in a SDI format, the convertion to the "SDI over IP" format occurs first in the source port converter 4 comprised in the source port $QA_2$; which can be configured as well such that it creates the packets of the "SDI over IP" format with an adjustable IP multicast destination address. For further explanation it is assumed that the cameras $Q_1$ und $Q_3$ in the example shown in FIG. 1 are configured such that they create packets with the IP multicast destination addresses $IPMZ_1$ and $IPMZ_3$, while the source port converter 4 is configured such that it creates packets with the IP multicast destination address $IPMZ_2$.

The IP multicast destination addresses allow for a connecting of the sinks $S_1, S_2, S_3$, here the two monitors and the editing suite, with the digital video streams forwarded in the "SDI over IP" format by the source ports $QA_1, QA_2, QA_3$. For this the apparatus 1 supports a multicast protocol, in this embodiment the IP multicast protocol, as well as corresponding control protocols, like, e.g., the so-called "Internet Group Management Protocol" (IGMP), a network protocol of the Internet protocol family which serves for the organization of IP multicast groups. With the help of corresponding IGMP messages the monitor $S_2$ and the digital editing suite $S_3$ can thus signalize to the apparatus 1 that they want to receive "digital video streams with a porticular IP multicast address". In words of the network jargon: The monitor $S_2$ and the digital editing suite $S_3$ can signalize to the apparatus 1 with the help of corresponding IGMP messages that they want to join a particular IP multicast group, i.e. that they want to receive packets of the digital video streams forwarded by the source ports $QA_1, QA_2, QA_3$ in the "SDI over IP" format with a particular IP multicast address, here, e.g., $IPMZ_1$. In case of monitor $S_1$, which is adapted to receive a digital video stream in a serial SDI format, the joining of a particular IP multicast group can occur via the sink port converter 5 comprised in the sink port $SA_1$.

In the example shown in FIG. 1 the digital editing suite $S_3$ of the apparatus 1 signalizes with the help of corresponding IGMP messages that it wants to receive the digital video streams with the IP multicast destination addresses $IPMZ_1$, $IPMZ_2$ und $IPMZ_3$, i.e. that it wants to receive the digital video streams of all three source ports $QA_1$, $QA_2$, $QA_3$; which are therefore forwarded be the apparatus 1 to the sink port $SA_3$ (visualized as the solid connective lines in the figure). The sink port converter 5 signalizes here to the apparatus 1 with the help of corresponding IGMP messages that it wants to receive the digital video stream with the IP multicast destination address $IPMZ_1$, i.e. that it wants to receive the digital video stream from the source port $QA_1$; which is therefore forwarded from the apparatus 1 to the sink port $SA_1$ (visualized as the solid connective lines in the figure).

The functionality of the apparatus 1 described so far corresponds basically with the functionality of already available IP multicast routers which correspondently distribute IP multicast streams with the help of standard network protocols such as IGMP or the so-called "Internet Control Message Protocol for the Internet Protocol Version 6" (ICMPv6). Here it is generally also possible to switch the sinks $S_1$, $S_2$, $S_3$, here the two monitors and the editing suite, between the different digital video streams during "current operations", i.e. while the sources $Q_1$, $Q_2$, $Q_3$, here the three television cameras, create digital video streams and feed them into the apparatus 1. However, this does not allow for a transparent switching, i.e. it is not possible to ensure that the respective switching occurs between two subsequent access units respectively, i.e., e.g., for digital video streams between tow chronologically sequent frames. Therefore, the previously described multicast routing functionality is rather suitable for setting a "fixed" configuration, i.e. setting a fixed allocation of sources $Q_1$, $Q_2$, $Q_3$ to sinks $S_1$, $S_2$, $S_3$ before initiation of "current operations".

In order to allow, in contrast, also for a transparent switching, the apparatus 1 therefore provides an "intern" switching sink $S_1$, $S_2$, $S_3$, which can be switched between the digital video streams of the sources $Q_1$, $Q_2$, $Q_3$ in order to receive them at the switching sink $S_S$ respectively. In the example shown in FIG. 1 the switching sink $S_S$ is first switched to the digital video stream of the camera $Q_1$ (visualized in the figure as the dashed line), so that it is received at the switching sink $S_S$ in the "SDI over IP" format. This switching process is also based in this embodiment on the IP multicast protocol described above, i.e. the switching sink joins an IP multicast group with a particular IP multicast destination address, here $IPMZ_1$, after a signalization by corresponding IGMP messages. The active switching status of the switching sink $S_S$, here "switched to the digital video stream with the IP multicast address $IPMZ_1$" can be represented in the apparatus 1 as, e.g., in the form of a corresponding switching table or the like (not shown).

The switching sink $S_S$ is now adapted to forward the received digital video stream in a packet-switched format, here correspondingly the "SDI over IP format" as well, wherein the packets are provided with a multi-point destination address allocated to the switching sink $S_S$, in this embodiment also an IP multicast destination address, which is preferably unambiguously configurable. In the example shown on FIG. 1 it is for further explanation assumed that the packets of the "SDI over IP" format forwarded by the sink $S_3$ are provided with the IP multicast destination address $IPMZ_S$. This address is different from the IP multicast destination addresses $IPMZ_1$, $IPMZ_2$ and $IPMZ_3$ (see above), i.e. it is unambiguous within the apparatus 1.

The IP multicast destination address (here $IPMZ_S$) allocated to the switching sink $S_S$ allows for a connection of the sinks $S_1$, $S_2$, $S_3$, here the two monitors and the editing suite, with the digital video stream forwarded by the switching sink $S_S$ in the "SDI over IP" format. In other words: The switching sink $S_S$ represents a (within the apparatus 1 unambiguous) IP multicast source from the two monitors' $S_1$ and $S_2$ and the digital editing suite's $S_3$ "point of view". The connecting of the sinks $S_1$, $S_2$, $S_3$ with the switching sink $S_S$ as "source" occurs, e.g., as described above with the help of corresponding IGMP messages as well. In the example shown in FIG. 1 the monitor $S_2$ of the apparatus 1 signalizes with the help of corresponding IGMP messages that it wants to receive the digital video stream with the IP multicast destination address $IPMZ_S$ i.e. that it wants to receive the digital video stream forwarded by the switching sink $S_S$, here the digital video stream of the camera $Q_1$: which is thus forwarded by the apparatus 1 to the sink port $SA_2$ (visualized as the solid connective line in the figure).

The use of the switching sink/source $S_S$ is advantageous to the previously described "direct" switching of the sources $Q_1$, $Q_2$, $Q_3$ to the sinks $S_1$, $S_2$, $S_3$ in so far as the switching process can easily be transparently implemented in the apparatus 1. This is explained in greater detail in the following with reference to FIG. 2, which shows schematically and exemplary an embodiment of the apparatus 1 for switching real-time media streams of one or multiple sources $Q_1$, $Q_2$, $Q_3$ to one or multiple sinks $S_1$, $S_2$, $S_3$ during a switching process.

In order to initiate the switching process the apparatus 1 supports a suitable control protocol such as, e.g., the so-called "Simple Network Management Protocol" (SNMP), a network protocol of the internet protocol family used for the management of devices connected to an IP network. With the help of corresponding SNMP messages, e.g. the monitor $S_2$ or the digital editing suite $S_3$, can then signalize to the apparatus 1 that the switching sink $S_S$ is to be switched from a digital video stream of a first source, e.g. the camera $Q_1$, to the digital video stream of a second source, e.g. the camera $Q_2$. In the example shown in FIG. 2 the switching process is initiated by the digital editing suite $S_3$ with the help of a corresponding SNMP message.

The switching process, i.e. the switching of the switching sink $S_S$, is based in turn on the IP multicast protocol as described above in this embodiment, however, it is implemented in the apparatus 1 such that it occurs transparently, i.e. it is ensured that the switching occurs between two chronologically sequent access units, i.e., e.g., with digital video streams between two chronologically sequent frames. Therefore the further apparatus 1 comprises a buffer 6, here shown as port of the switching sink $S_S$, in which data of the digital video stream of the first source (to which the switching sink $S_S$ has been switched to until now), in this example the digital video stream of the camera $Q_1$, and/or data of the digital video stream of the second source (to which the switching sink $S_S$ is to be switched to), in this case the digital video stream of the camera $Q_2$, can be buffered during the switching process. For transparent switching the forwarding of the digital video stream of the first source, here of the camera $Q_1$, is then terminated by the switching sink $S_S$ at a first switching point predetermined for this video stream or within a first switching range predetermined for this video stream respectively, and the forwarding of the digital video stream of the second source, here the camera Q1, is initiated by the switching sink $S_S$ at a second switching point predetermined for this video stream or within a second switching range predetermined for this video stream respectively. Here data of both digital video streams are in the buffer 6 for a short period of time due to the not given synchronicity of the IP and possibly to the phase shifting between the two digital video streams (visualized in the figure as the dashed lines).

The switching points or switching ranges respectively predetermined for the transparent switching depend on the media format of the respective stream. For the "SDI over IP" format, e.g., those are set on the "SDI level" in the previously mentioned guideline SMTPE RP 168 (English title "Definition of Vertical Interval Switching Point for Synchronous Video Switching").

In this embodiment the apparatus 1 identifies the media format (e.g. the SDI format 720p @ 1.485 Gbit/s) of a digital video stream based on the "Video Payload Identifier" (VPID) transmitted in the packets of the "SDI over IP" format. The predetermined switching point or switching range respectively for a digital video stream of the identified media format can be stored in the apparatus 1 in a table or the like, e.g. For switching digital video streams in the "SDI over IP" format the pre-determined switching points or switching ranges respectively of both video streams have then to be identified in the corresponding packets first. This can occur, e.g. by the way that for each of the two digital video streams the next packet is first searched in which the so-called "RTP Marker Bit" is set. This bit indicates that the corresponding packet contains the end of a frame. Due to the knowledge of the SDI format, e.g. 720p @ 1.485 Gbit/s, identified by the "Video Payload Identifier" (VPID), and the switching point or switching range respectively predetermined for this media format, as well as the knowledge of the number of payload data bits (video stream bits) that can be transmitted per packet, e.g. the packet containing the switching point can then be determined in each of the two digital video streams and a transparent switching can thus be realized. Alternatively the packets containing the switching points or the packets within the switching range respectively, could also be marked directly with the help of so-called "Extension Header", so that the apparatus 1 merely has to search for packets with those Headers. The active switching status of the switching sink $S_S$, here "switch from the digital video stream with the IP multicast address $IMPZ_1$ to the digital video stream with the IP multicast address $IMPZ_2$" can be represented in the apparatus 1 e.g. in the form of a corresponding switching table or the like (not shown).

During a switch request packets of the digital video stream are forwarded by the switching sink $S_S$ as long as e.g. the predetermined switching point is reached. In case the switching point is located between two packets the packets are forwarded from the second source by the switching sink $S_S$ after the switching point. In case the switching point cannot be set between two packets it has to be switched within a packet. Therefore a new packet is created which contains data of the first source up until the switching point and data of the second source after the switching point, and which is forwarded instead of the packet with the switching point by the switching sink $S_S$. It is preferred to provide a buffer of at least the length of one frame (English "videoframe") for each digital video stream of one source in order to allow for a minimal reaction time.

Due to the switching behavior described above, the data stream is flawless on the "SDI level", but the packet oriented protocols (esp. RTP and HBRMT) can contain continuity errors in sequence numbers and time stamps. Therefore, it is preferred that the data stream in the switching sink $S_S$ is adapted in all protocol levels which feature corresponding data. Here, e.g., an offset can be used for each affected protocol field, which is adapted correspondingly during each switch request to the difference between the sources to be switched.

Figure 2:
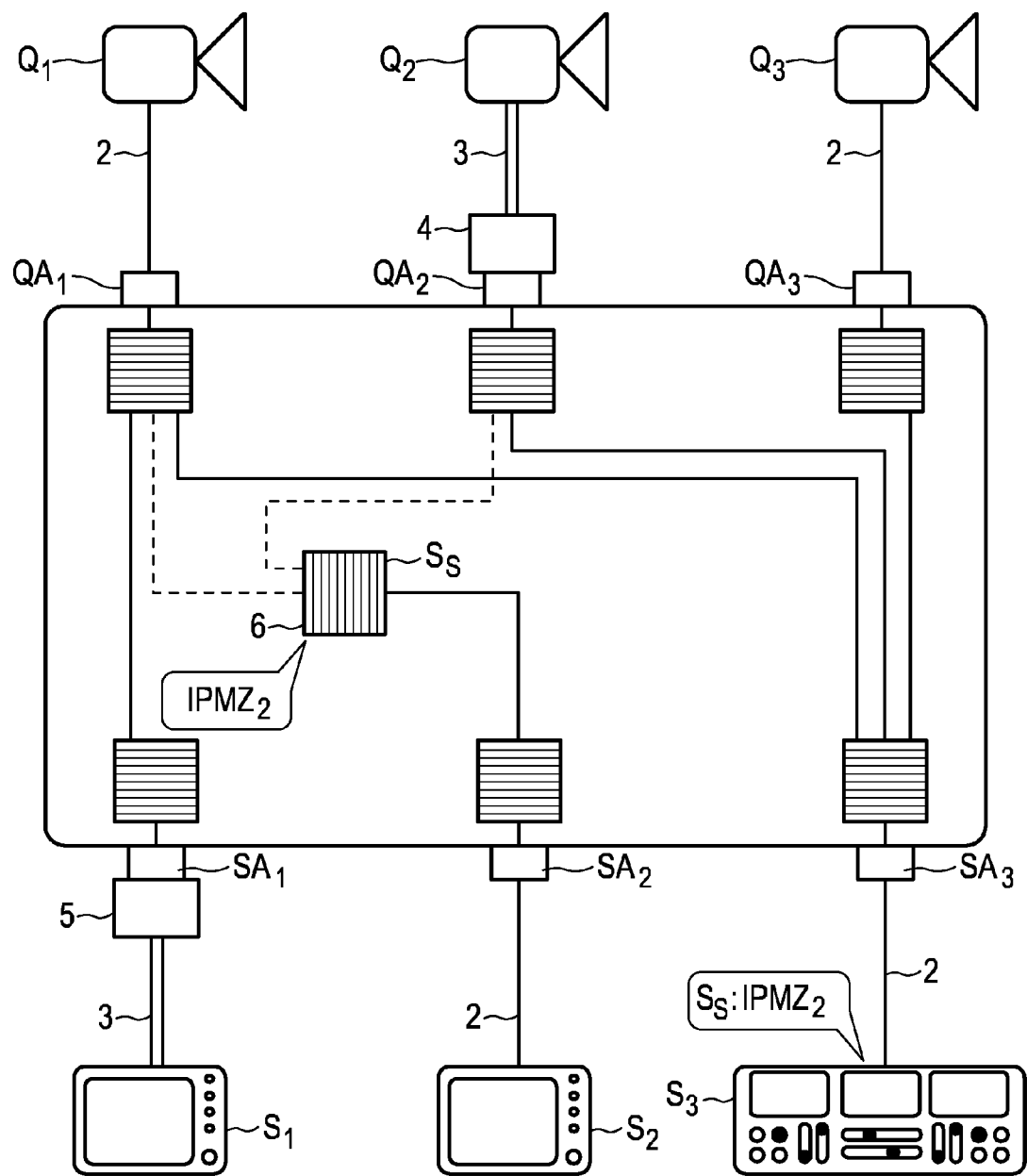
FIG. 2 shows a schematic and exemplary embodiment of an apparatus for switching real-time media streams of one or multiple sources to one or multiple sinks during a switching process, FIG. 3. shows a schematic and exemplary embodiment of an apparatus for switching real-time media streams of one or multiple sources to one or multiple sinks in a second switching status.
Figure 3:
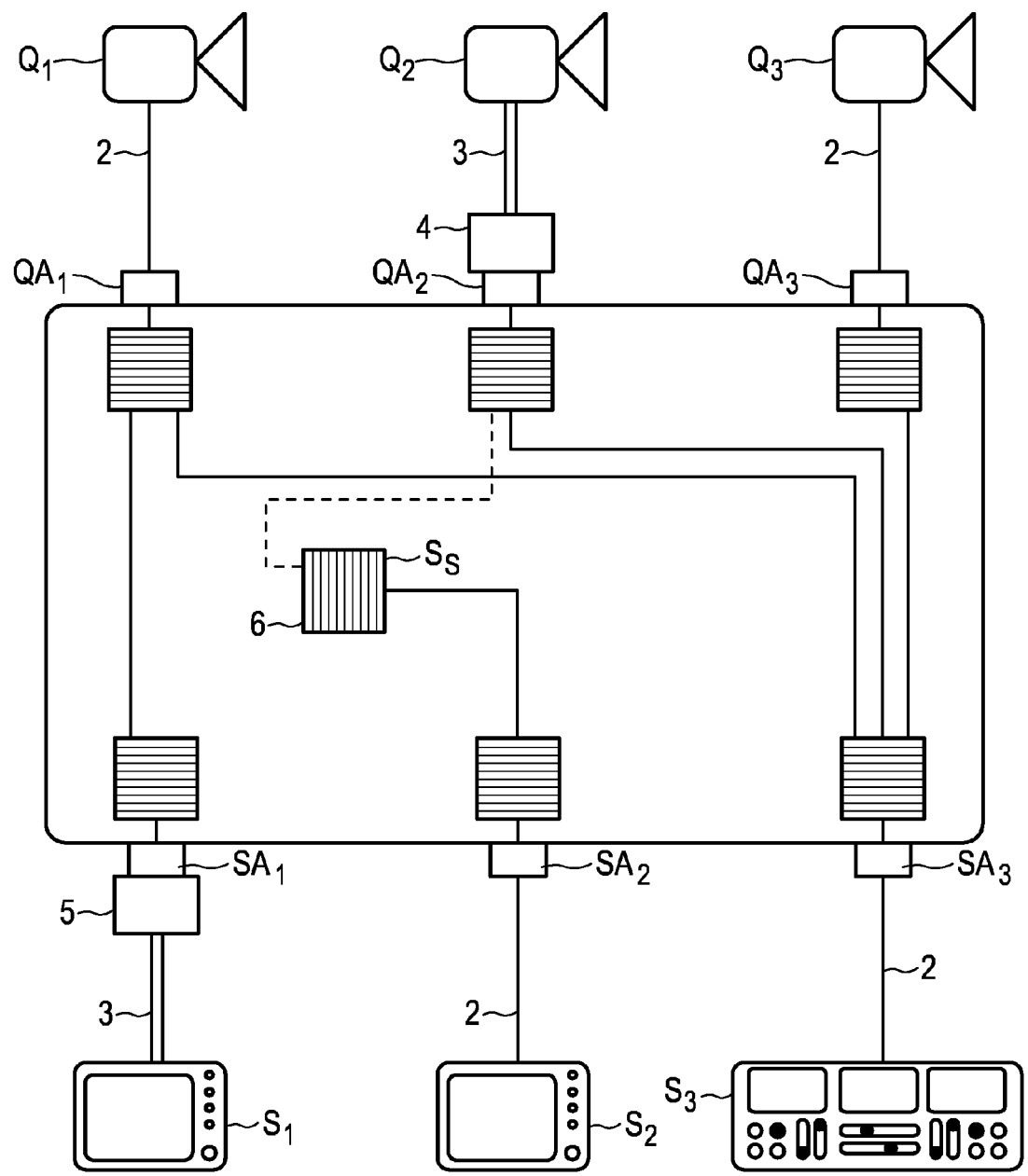

FIG. 3 shows schematically and exemplary an embodiment of the apparatus 1 for switching real-time media streams of one or multiple sources $Q_1$, $Q_2$, $Q_3$ to one or multiple sinks $S_1$, $S_2$, $S_3$ in a second switching status, here after the switching process explained with reference to FIG. 2. The figure shows that the switching sink $S_S$ in this status is now switched to the digital video stream of the camera $Q_2$ (visualized in the figure as the dashed line), so that it is received at the switching sink $S_S$ in the "SDI over IP" format and forwarded by the apparatus 1 to the sink port $SA_2$. The active switching status of the switching sink $S_S$, here "switched to the digital video stream with the IP multicast address $IMPZ_2$", can be represented in the apparatus 1 e.g. in the form of a corresponding switching table or the like (not shown).

Figure 4:
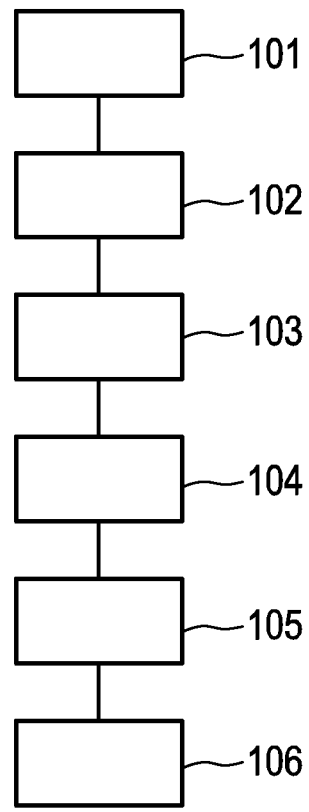
FIG. 4 shows a schematic flow diagram of an embodiment of a method for switching real-time media streams of one or multiple sources to one or multiple sinks.

FIG. 4 shows schematically a flow diagram of an embodiment of a method for switching real-time media streams of one or multiple sources $Q_1$, $Q_2$, $Q_3$ to one or multiple sinks $S_1$, $S_2$, $S_3$. The method can be accomplished, e.g., by means of the apparatus 1 as described above with reference to the FIGS. 1 to 3.

In step 101 one or multiple sources $Q_1$, $Q_2$, $Q_3$ are connected to one or multiple source ports $QA_1$, $QA_2$, $QA_3$.

In step 102 one or multiple sinks $S_1$, $S_2$, $S_3$ are connected to one or multiple sink ports $SA_1$, $SA_2$, $SA_3$.

In step 103 a switching sink $S_S$ is provided and switched to a real-time media stream of a first source $Q_1$.

In step 104 the real-time media stream of the first source $Q_1$ is received at the switching sink $S_S$ in a packet-switched format.

In step 105 the received real-time media stream is forwarded in the packet switched format by the switching sink $S_S$, wherein the packets are provided with a first multi-point address $IPMZ_S$ allocated to the switching sink $S_S$.

In step 106 the one or multiple sinks $S_2$ are connected to the real-time media stream of the first source $Q_1$ forwarded by the switching sink $S_S$.

It should be noted that the above mentioned process steps are not necessarily conducted in that order. For instance, the one or multiple sinks $S_1$, $S_2$, $S_3$ can be connected to one or multiple sink ports $SA_1$, $SA_2$, $SA_3$ (step 102) before the one or multiple sources $Q_1$, $Q_2$, $Q_3$ are connected to one or multiple source ports $QA_1$, $QA_2$, $QA_3$ (step 101).

While the embodiments as described above mainly regard switching of digital video streams in the "SDI over IP" format (optionally with embedded time code and/or audio streams) the apparatus 1 can also be adapted so as to switch other kinds of real-time media streams, e.g. digital audio streams, compressed video formats such as JPEG2000 or container formats such as MXF, in a packet-switched format. The switching points switching ranges respectively predetermined for these media formats can also be stored in a table or the like in the apparatus 1 and the identification of the respective media format can occur, e.g. by suitable identification data, i.e. analogously to the "Video Payload Identifier" (VPID) described above. Furthermore, the apparatus 1 can be further adapted to be extendable by the input of switching rules which state the switching point or switching range respectively for a real-time media stream of a given media format that is previously not supported from the apparatus 1.

In the embodiments mentioned above a switching sink $S_S$ is provided by the apparatus 1. In order to be able to switch any number of sources with a maximum of flexibility transparently to any number of sinks, the apparatus 1 may also provide multiple switching sinks It should be noted that the physical ports of the apparatus 1 do not necessarily function exclusively as a source port or exclusively as a sink port. Instead it is possible to use a single physical port as both a source port and a sink port depending on whether a source or a sink is connected to it. Particularly for those ports that are connected to either a source, which transmits a real-time media stream in a packet-switched format, or a sink, which receives a real-time media stream in a packet-switched format, it is possible that the port serves as a source port and a sink port at the same time (e.g. in case the device connected at it functions as a source and a sink at the same time).

The words "feature" and "comprise" do not exclude other elements or steps, and the indefinite article "a/an" does not exclude a plural.

A single unit or device can conduct the functions of multiple elements, which are specified in the claims.

The fact that single functions and/or elements are specified in different independent claims does not mean that a combination of said functions and/or elements could not be used advantageously.

The reference numerals in the claims are not to be understood in a way that the subject matter and scope of protection of the claims are restricted by these reference numerals.

The invention claimed is:

1. An apparatus for switching real-time media streams of one or multiple sources to one or multiple sinks, wherein the apparatus comprises:
   one or multiple source ports for connecting one or multiple sources,
   one or multiple sink ports for connecting the one or multiple sinks,
   wherein the apparatus is adapted so as to provide a switching sink and to switch it to a real-time media stream of a first source,
   wherein the switching sink is adapted so as to receive the real-time media stream of the first source in a packet-switched format having a first multi-point destination address and to forward the received real-time media stream in a packet-switched format, wherein the packets are provided with a second multi-point destination address allocated to the switching sink during forwarding, in order to allow for a connection of the one or multiple sinks with the real-time media stream of the first source forwarded by the switching sink,
   wherein the apparatus is further adapted so as to switch the switching sink from a real-time media stream of a first source to a real-time media stream of a second source so that then the real-time media stream of the second source is received at the switching sink,
   wherein the apparatus is further adapted so as to terminate, during the switching of the switching sink from the real-time media stream of the first source to the real-time media stream of the second source, the forwarding of the real-time media stream of the first source by the switching sink at a first switching point predetermined for this real-time media stream or within a first switching range predetermined for this real-time media stream, and to initiate the forwarding of the real-time media stream of the second source by the switching sink at a second switching point predetermined for this real time media stream or within a second switching range predetermined for this real time media stream, and
   wherein the first and/or the second switching point or the first and/or second switching range are dependent on a media format of the respective real-time media stream.

2. The apparatus according to claim 1, wherein the apparatus further comprises a buffer and is adapted so as to buffer the data of the real-time media stream of the first source and/or data of the real-time media stream of the second source in the buffer during the switching of the switching sink from the real-time media stream of the first source to the real-time media stream of the second source.

3. The apparatus according to claim 1, wherein the apparatus is further adapted to identify the media format of the respective real-time media stream based on identification data in the real-time media stream.

4. The apparatus according to claim 1, wherein the apparatus is further adapted to be extendable by the input of switching rules which state the switching point or switching range for a real-time media stream of a given media format.

5. The apparatus according to claim 1, wherein at least one source port is adapted so that a source is connectable to it which transmits a real-time media stream in a packet-switched format.

6. The apparatus according to claim 1, wherein at least one sink connection is adapted so that a sink is connectable to it which receives a real-time media stream in a packet-switched format.

7. The apparatus according to claim 1, wherein at least one source port comprises a source port converter which is adapted to convert a real-time media stream of a source connected to the source port from a serial format into the packet-switched format.

8. The apparatus according to claim 1, wherein at least one sink port comprises a sink port converter which is adapted to convert a real-time media stream for a sink connected to the sink port from the packet-switched format into a serial format.

9. The apparatus according to claim 1, wherein the apparatus is adapted so as to forward a real-time media stream in a packet-switched format from one of the one or multiple source ports, wherein the packets comprise a second multi-point destination address which allows for a connecting of the one or multiple sinks with the real-time media stream forwarded by the one of the one or multiple sources.

10. The apparatus according to claim 1, wherein the packet-switched format comprises a format according to the Internet Protocol and the first multi-point destination address is an IP multicast destination address.

11. A method for switching real-time media streams of one or multiple sources to one or multiple sinks, wherein the method comprises:
   connecting of the one or multiple sources to one or multiple source ports,
   connecting of the one or multiple sinks to one or multiple sink ports,
   providing of a switching sink and its switching to a real-time media stream of a first source,
   receiving of the real-time media stream from the first source in a packet-switched format having a first multi-point destination address at the switching sink,
   forwarding of the received real-time media stream in the packet-switched format by the switching sink, wherein the packets are provided with a second multipoint destination address allocated to the switching sink during forwarding,
   connecting of the one or multiple sinks with the real-time media stream of the first source forwarded by the switching sink,
   switching the switching sink from said real-time media stream of said first source to a real-time media stream of a second source so that then the real-time media stream of said second source is received at the switching sink, terminating, during the switching of the switching sink from the real-time media stream of the first source to the real-time media stream of the second source, the forwarding of the real-time media stream of the first source by the switching sink at a first switching point predetermined for this real-time media stream or within a first switching range predetermined for this real-time media stream, and initiating the forwarding of the real-time media stream of the second source by the switching sink at a second switching point predetermined for this real time media stream or within a second switching range predetermined for this real time media stream, wherein the first and/or the second switching point or the first and/or second switching range are dependent on a media format of the respective real-time media stream.

* * * * *